(12) United States Patent
Portinari et al.

(10) Patent No.: US 10,363,714 B2
(45) Date of Patent: Jul. 30, 2019

(54) METHOD, PROCESS AND PLANT FOR CONTROLLING THE MANUFACTURE OF TYRES FOR VEHICLE WHEELS

(71) Applicant: PIRELLI TYRE S.P.A., Milan (IT)

(72) Inventors: Gianni Portinari, Milan (IT); Davide Conti, Milan (IT); Luigi Antonio Badolato, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 410 days.

(21) Appl. No.: 14/364,934

(22) PCT Filed: Dec. 19, 2012

(86) PCT No.: PCT/IB2012/057466
§ 371 (c)(1),
(2) Date: Jun. 12, 2014

(87) PCT Pub. No.: WO2013/093791
PCT Pub. Date: Jun. 27, 2013

(65) Prior Publication Data
US 2014/0374007 A1    Dec. 25, 2014

Related U.S. Application Data

(60) Provisional application No. 61/596,477, filed on Feb. 8, 2012.

(30) Foreign Application Priority Data

Dec. 23, 2011    (IT) .................... MI2011A002368 U

(51) Int. Cl.
*B29D 30/20* (2006.01)
*B29D 30/24* (2006.01)
*B29D 30/00* (2006.01)

(52) U.S. Cl.
CPC ......... *B29D 30/246* (2013.01); *B29D 30/005* (2013.01); *B29D 30/0016* (2013.01);
(Continued)

(58) Field of Classification Search
CPC .. B29D 30/0016; B29D 30/005; B29D 30/20; B29D 30/28; B29D 30/246;
(Continued)

(56) References Cited

U.S. PATENT DOCUMENTS 3,318,745 A * 5/1967 Black ................ B29D 30/0061
156/111
3,737,356 A * 6/1973 Askam .................. B29D 30/28
156/132

(Continued)

FOREIGN PATENT DOCUMENTS

DE    199 18 523    4/2000
EP    0 555 813    8/1993

(Continued)

OTHER PUBLICATIONS

International Search Report from the European Patent Office for International Application No. PCT/IB2012/057466, dated Mar. 15, 2013.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

In building tyres, an intermediate portion of a carcass structure is built at a time on a respective forming drum within an intermediate forming line. The forming drum with the intermediate portion of the carcass structure is made available at a first transfer location. The intermediate portion of the carcass structure is completed through n completion locations with n≥1 and then transferred for the subsequent (Continued)

assembling with a crown structure to a second transfer location. At an operating moment in which the first transfer location is occupied by a forming drum coming from the intermediate forming line or intended for the intermediate forming line, from one to n locations selected from the n completion locations and the second transfer location are occupied by respective forming drums.

30 Claims, 12 Drawing Sheets

(52) U.S. Cl.
CPC ...... *B29D 30/20* (2013.01); *B29D 2030/0022* (2013.01); *B29D 2030/202* (2013.01); *B29D 2030/204* (2013.01)

(58) Field of Classification Search
CPC ...... B29D 2030/0022; B29D 2030/202; B29D 2030/204
USPC .................................. 156/111, 396
See application file for complete search history.

(56) References Cited

U.S. PATENT DOCUMENTS

| | | | |
|---|---|---|---|
| 4,268,330 A | | 5/1981 | Komatsu et al. |
| 5,411,626 A | | 5/1995 | Coretta et al. |
| 2007/0295442 A1* | 12/2007 | Minakawa | ............... B23Q 7/03 156/111 |
| 2008/0190562 A1 | | 8/2008 | Winkler et al. |
| 2010/0163158 A1* | 7/2010 | Piantanida | ........... B29D 30/244 156/111 |

FOREIGN PATENT DOCUMENTS

| | | | |
|---|---|---|---|
| JP | 08011232 A | * | 1/1996 |
| RU | 2344933 C1 | | 1/2009 |

OTHER PUBLICATIONS

Office Action dated Apr. 3, 2017, by Mexican Patent Office in corresponding Mexican Patent Application No. MX/a/2014/006944. (3 pgs).

Office Action dated Oct. 6, 2016, by the Mexican Patent Office in corresponding Application No. MX/a/2014/005944 (3 pages).

English-language translation of Office Action dated Oct. 6, 2016, by the Mexican Patent Office in corresponding Application No. MX/a/2014/005944 (3 pages).

Official Action issued by the Federal Service for Intellectual Property on Nov. 2, 2016 in corresponding Appiication No. 2014129205/05(047093) (4 pages).

English-language translation of Official Action issued by the Federal Service for Intellectual Property on Nov. 2, 2016 in corresponding Application No. 2014129205/05(047093) (3 pages).

Decision on Grant issued by the Federal Service for Intellectual Property on Nov. 28, 2016 in corresponding Application No. 2014129205/05(047093) (4 pages).

English language translation of Decision or Grant issued by the Federal Service for Intellectual Property on Nov. 28, 2016 in corresponding Application No. 2014129205/05(047093) (4 pages).

Office Action dated Dec. 22, 2016, by the European Patent Office in corresponding Application No. 12 823 010.9-1706 (4 pages).

\* cited by examiner

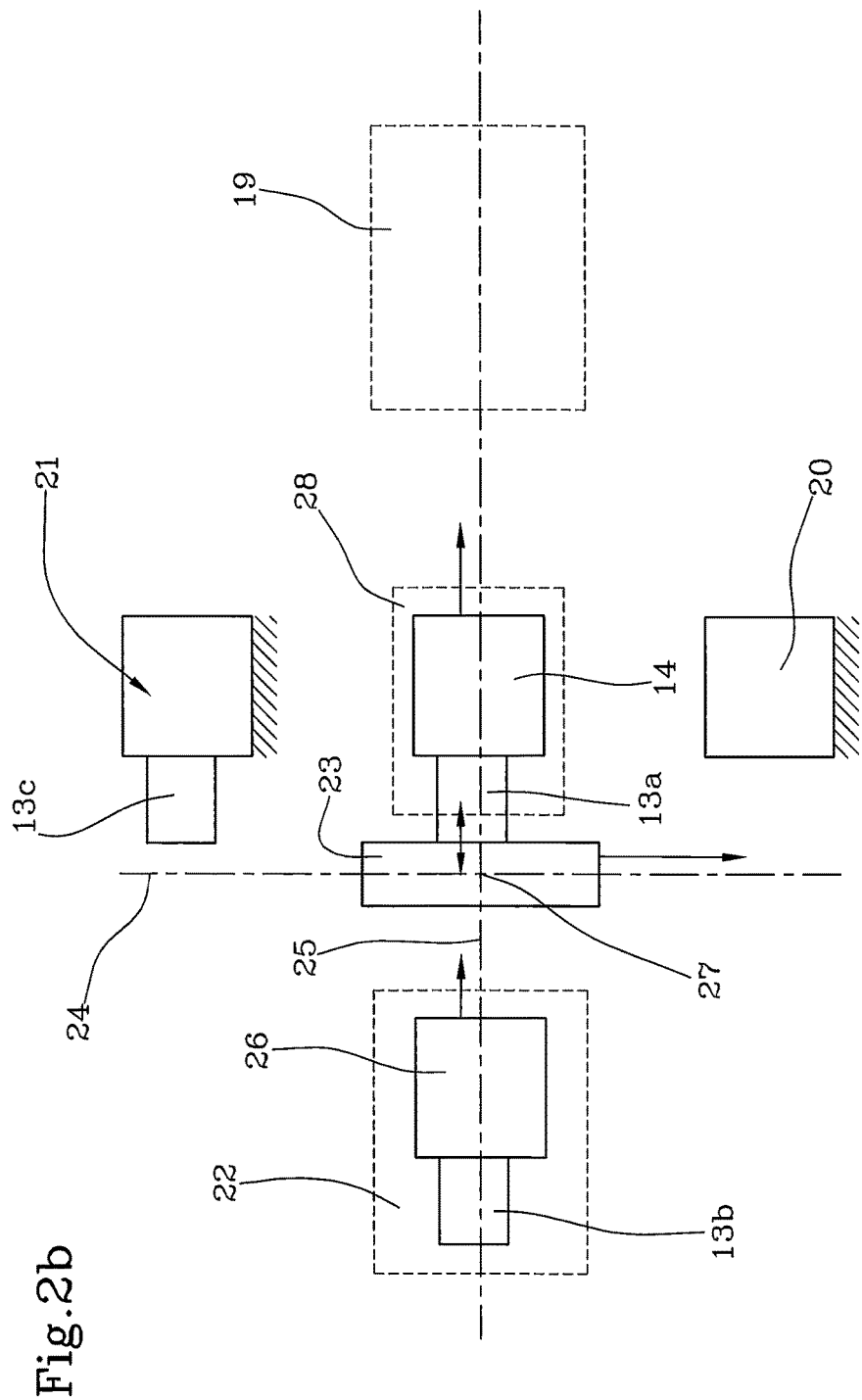

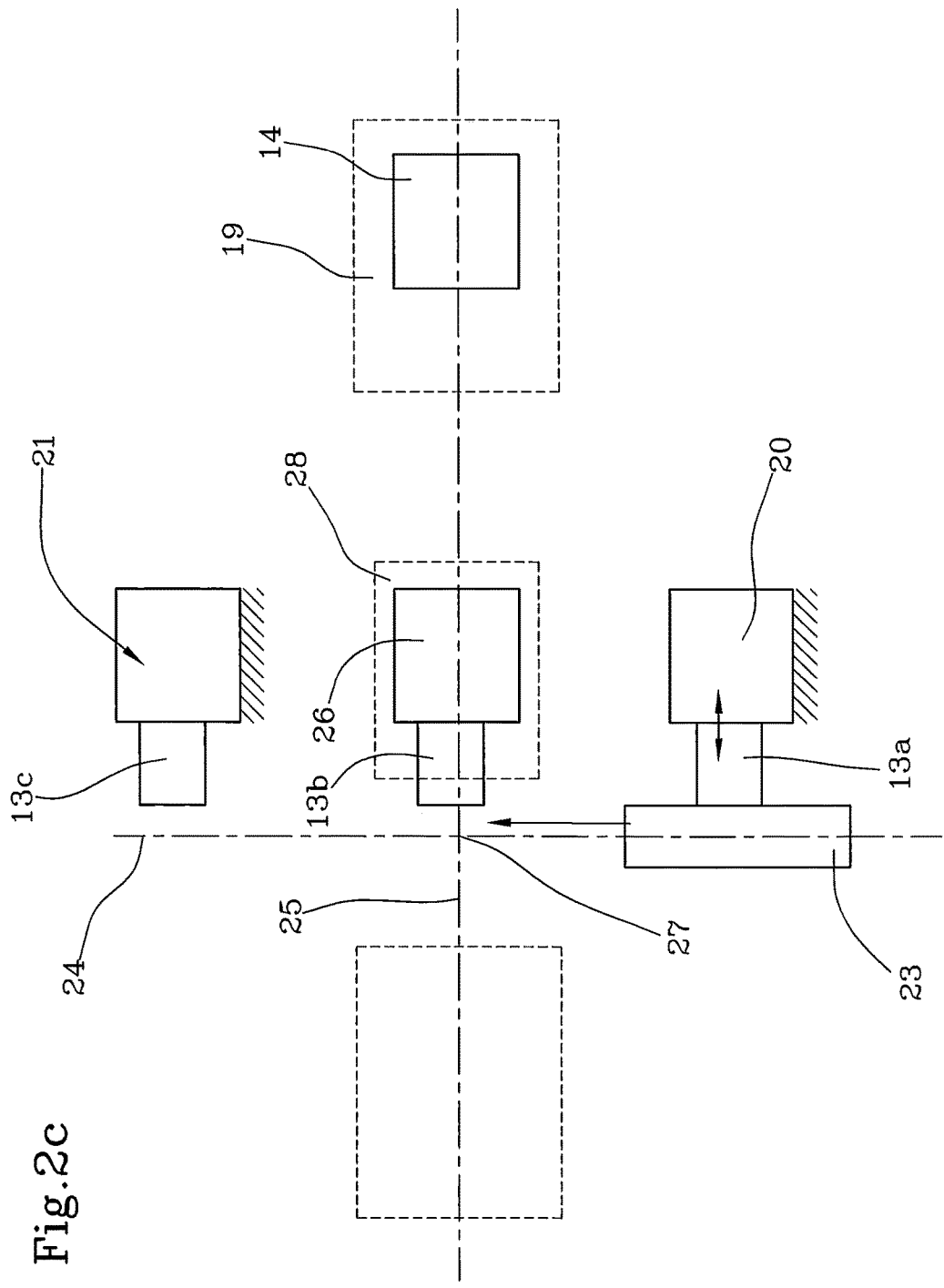

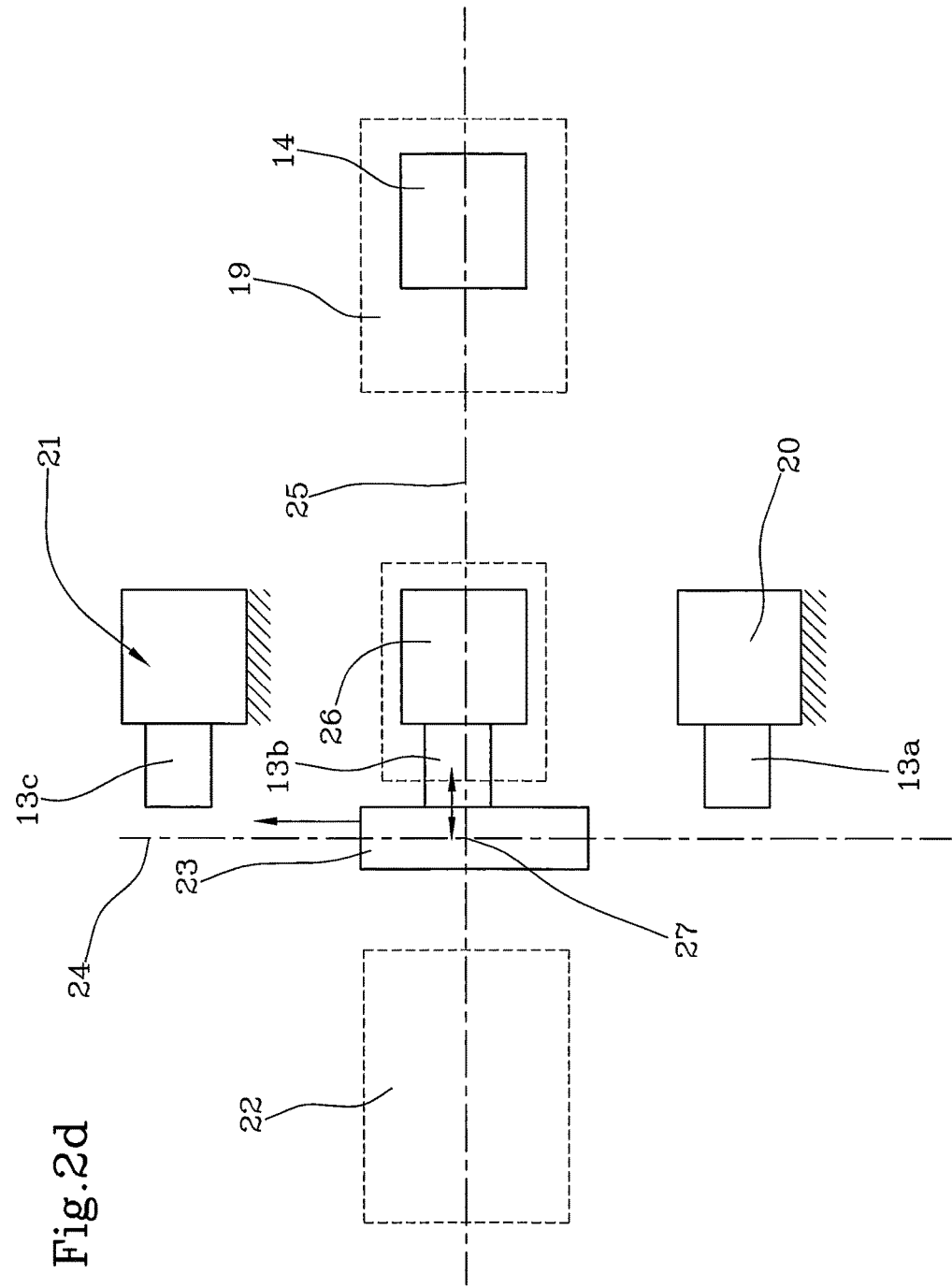

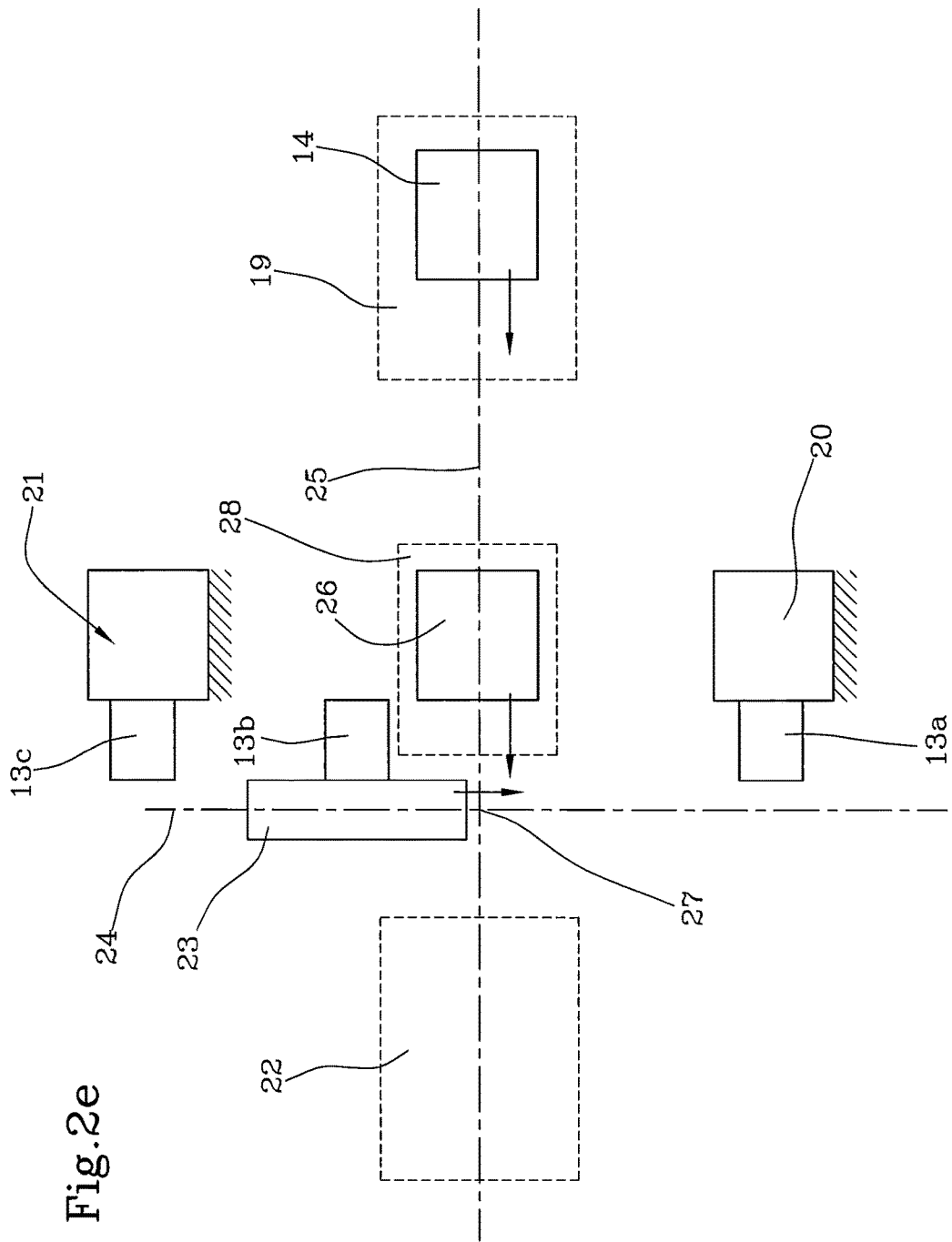

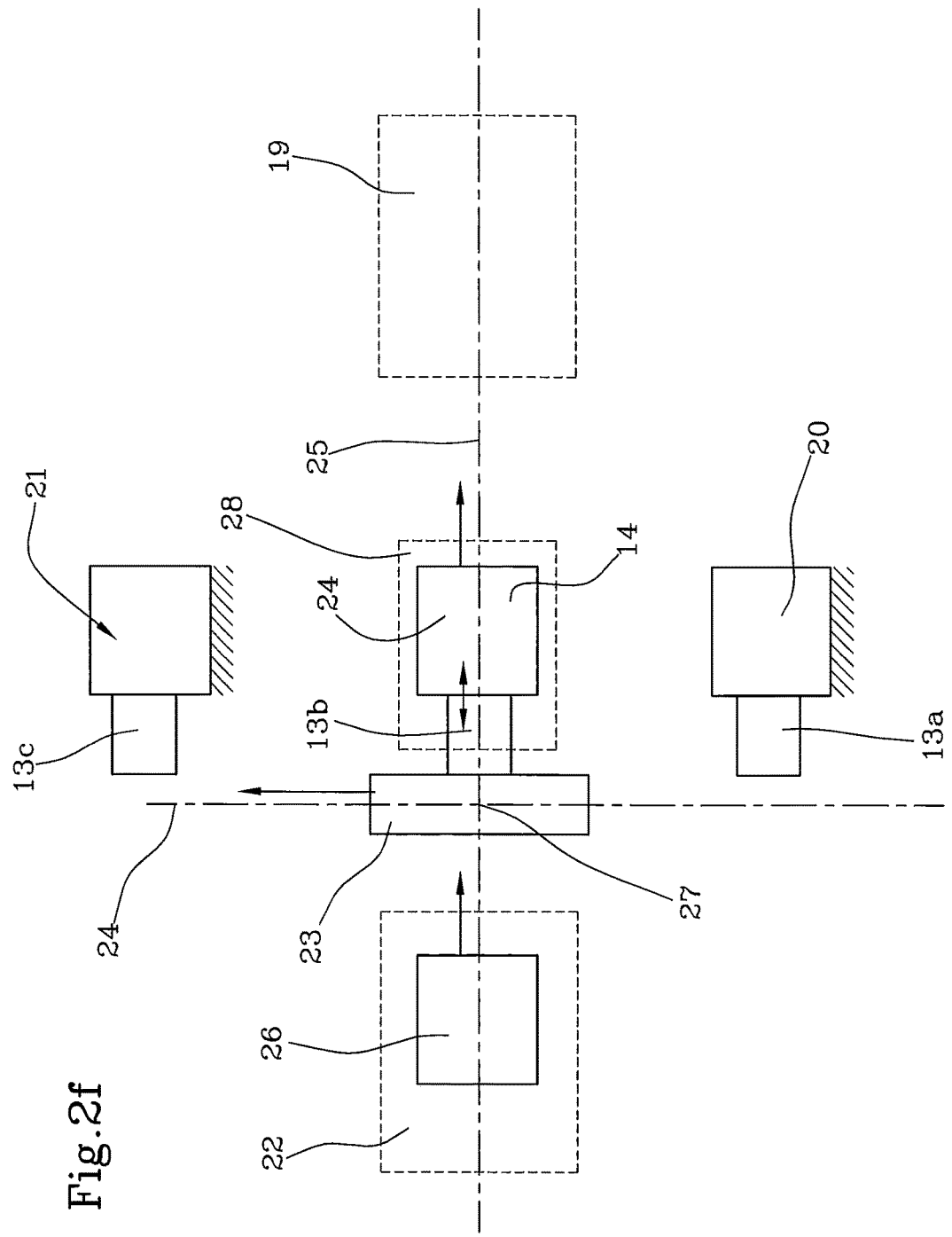

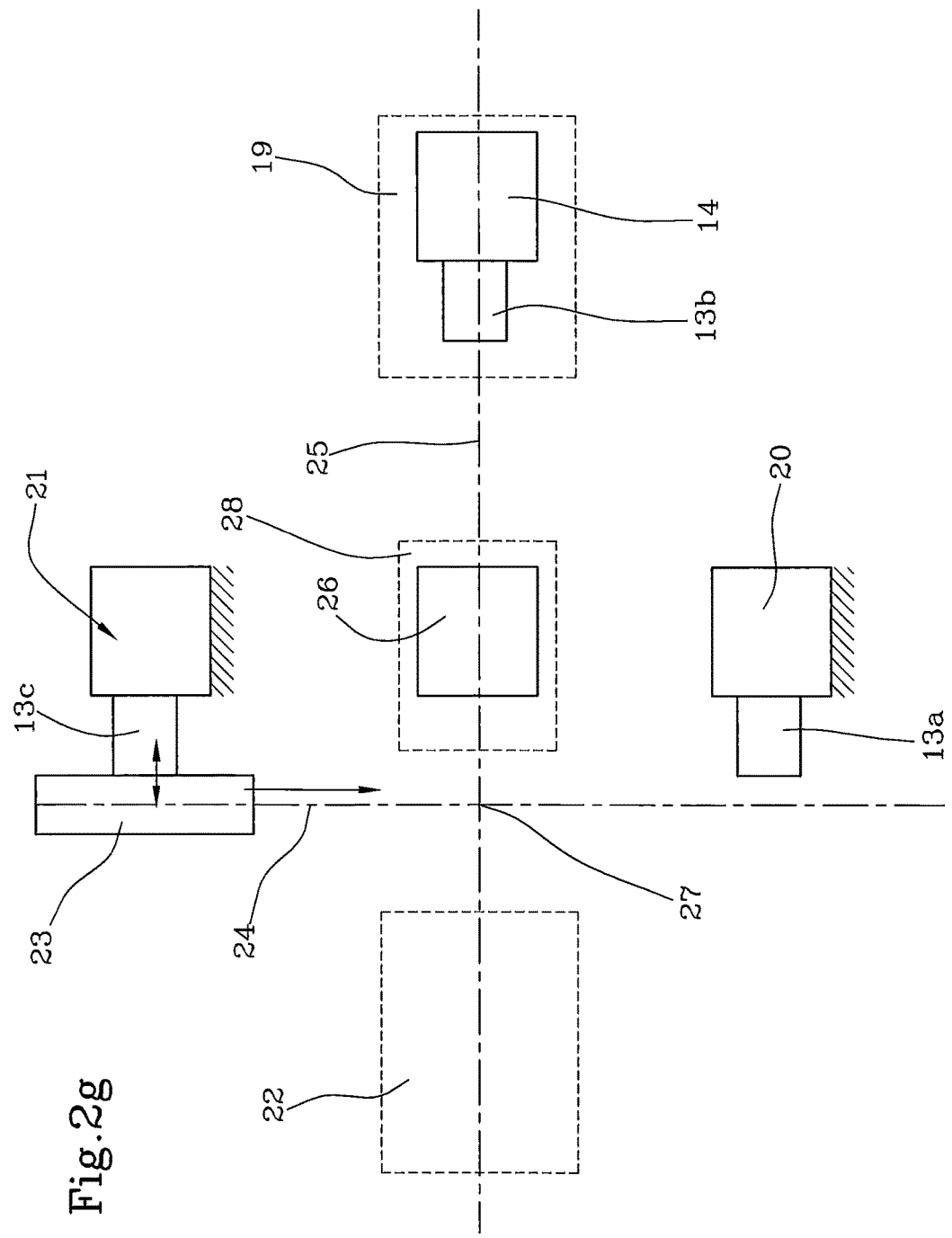

METHOD, PROCESS AND PLANT FOR CONTROLLING THE MANUFACTURE OF TYRES FOR VEHICLE WHEELS

CROSS REFERENCE TO RELATED APPLICATIONS

This application is a national phase application based on PCT/IB2012/057466, filed Dec. 19, 2012, which claims the priority of Italian Patent Application No. MI2011A002368, filed Dec. 23, 2011, and the benefit of U.S. Provisional Application No. 61/596,477, filed Feb. 8, 2012, the content of each application being incorporated herein by reference.

BACKGROUND OF THE INVENTION

Field Of The Invention

The present invention aims at providing a method, a process and a plant for controlling building of tyres for vehicle wheels.

Description Of The Related Art

A tyre for vehicle wheels generally comprises a carcass structure comprising at least one carcass ply having respectively opposite terminal zones respectively engaged to annular anchoring structures, generally referred to as "bead cores", integrated in the areas usually referred to by the name "beads", having an inner diameter substantially corresponding to a so-called "rim diameter" of the tyre on a respective mounting rim. The tyre also comprises a crown structure comprising at least one belt strip located in a radially outer position with respect to the carcass ply and a radially outer tread band with respect to the belt strip. Between the tread band and the belt strip is there may be interposed a so-called "underlayer" made of elastomeric material with properties suitable to guarantee a stable union of the belt strip/strips with the tread band itself. On the lateral surfaces of the carcass structure, each extending from one of the lateral edges of the tread band up to the height of the respective annular anchoring structure to the beads, there are also applied respective sidewalls made of elastomeric material. In the tyres of the "tubeless" type, the carcass ply is internally covered by a layer of elastomeric material preferably butyl-based, usually referred to as "liner" having optimal air impermeability characteristics and extending from one bead to the other.

The expression "elastomeric material" is used to indicate a composition comprising at least one elastomeric polymer and at least one reinforcing load. Preferably, such composition additionally comprises additives such as, for example, a cross-linking and/or a plasticising agent. Due to the presence of the cross-linking agent, such material can be cross-linked by heating, thus forming the final product.

The expression "intermediate portion of the carcass structure" is used to indicate at least one carcass ply.

The expression "completion locations" is used to indicate one or more locations comprising apparatuses adapted to deposit new components and/or shape the previously deposited components. For example, the following can be provided for: a location comprising a tyre bead-forming station and a location comprising a rolling station, possibly integrated in the tyre bead-forming station. Preferably the completion locations and the relative apparatus are fixed, indicated with the term "fixed" locations/apparatus which are not subjected to a transfer through movements related to the type of processing carried out, for example rotations, lifting and/or lowering to adapt to the diameter of the tyre, contraction and expansion movements, being allowed.

The expression "transfer location" is used to indicate one or more locations in which the forming drum for a subsequent processing is made available. For example a first transfer location operatively disposed between an intermediate forming line and at least one completion location may be provided. The first transfer location may for example be reached by a moveable shuttle along the intermediate forming line. Furthermore a second transfer location operatively disposed between at least one completion location and a station of assembling the crown structure, may be provided for. The second transfer location may for example be reached by a moveable shuttle. A transfer location may be fixed or variably identifiable along a trajectory of a shuttle.

The term "trajectory" is used to indicate a path covered for example by a handling device and/or one or more shuttles for transferring a forming drum. It may be a rectilinear or broken trajectory. The same trajectory may be defined by one or more shuttles.

The expression "operating moment" is used to indicate a operating instant of the plant.

Document EP 0 555 813 in the name of the same Applicant discloses a plant for building carcass structures far vehicle wheels comprising a plurality of building drums moved along an assembling path. Each drum meets, according to a predefined succession, a number of primary work stations, each adapted to apply a respective common main component to a plurality of carcass types, alternated with auxiliary work stations adapted to apply accessory components. Each auxiliary work station may be removed and replaced with a different station according to the type of process to be performed and it is moveable between a rest position, in which it is perpendicularly moved away from the assembling path, and a work position, in which it is operatively disposed along the assembling path, for performing the application of the respective accessory component. The primary work stations may be mutually approached or moved away along the assembling path.

SUMMARY OF THE INVENTION

The Applicant observed that in the plants of the type illustrated in EP 0 555 813 though allowing moving and/or replacing some work stations, the fact that the drums advance one after the other through the processing stations disposed in succession limits the flexibility thereof.

In such context, the Applicant proposed to increase the flexibility of the plants for the production of the tyres without increasing the cycle time.

In particular, the Applicant perceived the importance of building structurally different tyres without modifying the plant but simply changing the manufacturing instructions and allowing, in the same plant, the deposition of the semi-finished products in different radial and/or axial positions on the forming drums according to the manufacturing instructions.

Thus, the Applicant perceived that dividing the building of the carcass structure allows on one hand controlling and modifying the sequence of the building of an intermediate portion of the carcass structure and on the other compactly and quickly managing the transfer of the forming drum between one or more completion locations.

Finally, the Applicant has found that transferring at least one forming drum, between different completion and transfer locations so that the trajectories covered by said at least one forming drum cross each other at a point allows maintaining operative and productive flexibility to the saturation of the line, i.e. until there is present a forming drum for each location and transfer completion except one.

The Applicant has also found that occupying a first transfer location with a forming drum coming from an intermediate forming line or intended for said intermediate forming line, and at the same time occupying from one to n locations selected from n completion locations and a second transfer location with respective forming drums allows not only obtaining flexibility and reliability of the corresponding production plant, in the different operative contexts related to the different tyres being processed, but also reducing the cycle time.

More specifically, according to a first aspect, the present invention regards a method for controlling building tyres for vehicle wheels comprising:

building a carcass structure on a forming drum;
assembling the carcass structure to a crown structure.

Preferably, building the carcass structure comprises at least one of the following activities:

building an intermediate portion of the carcass structure at a time on a respective forming drum within an intermediate forming line;

making available the forming drum with the intermediate portion of the carcass structure at a first transfer location;

completing the intermediate portion of the carcass structure transferring the respective forming drum between the first transfer location, n completion locations with n≥1, and a second transfer location at which the carcass structure is made available for the subsequent assembling with the crown structure by unloading from the respective forming drum;

transferring the forming drum clear of the carcass structure from the second transfer location to the first transfer location for building a subsequent intermediate portion of the carcass structure.

Preferably, at an operating moment at which the first transfer location is occupied by a forming drum coming from the intermediate forming line or intended for the intermediate forming line, there are one to n locations selected from the n completion locations and the second transfer location that are occupied by respective forming drums.

The Applicant deems that the use—at the same time—of a forming drum at the intermediate forming line and at least one forming drum at the completion locations of the intermediate carcass structure or the second transfer location allows adapting the times of the various steps for limiting the inoperative times and avoid standby locations of the forming drum.

More specifically, according to a second aspect, the present invention regards a process for controlling building tyres for vehicle wheels comprising forming a carcass structure of a tyre on a forming drum, by at least one of the following activities:

making available the forming drum on a first shuttle moveable along an intermediate forming line;

moving the first shuttle on the intermediate forming line to bring it to at least some of a plurality of dispensing stations in which, at each of said at least some dispensing stations a component of an intermediate portion of the carcass structure is formed;

bringing the first shuttle comprising the forming drum provided with the intermediate portion of the carcass structure to a first transfer location;

transferring the forming drum from the first shuttle to a handling device moveable between n completion locations with n≥1 bringing the first shuttle to an exchange location with said handling device;

completing the carcass structure by transferring the forming drum between the n completion locations by said handling device;

transferring the forming drum provided with the completed carcass structure to a second shuttle brought to an exchange position with said handling device;

bringing the second shuttle in a second transfer location for subsequent transfer of the carcass structure for assembling it to the crown structure;

transferring the forming drum clear of the carcass structure from the second shuttle to the first shuttle for building a subsequent intermediate portion of the carcass structure.

Preferably, at an operating moment at which the first shuttle is occupied by a forming drum coming from the intermediate forming line or intended for the intermediate forming line, one to n forming drums are processed between the remaining n completion locations and the second shuttle.

According to a further aspect, the present invention regards a plant for controlling building of tyres for vehicle wheels comprising at least one of the following characteristics:

a building line for a carcass structure on a forming drum;
a station of assembling the carcass structure to a crown structure.

Preferably, the building line of the carcass structure comprises at least one of the following characteristics:

an intermediate forming line for manufacturing an intermediate portion of the carcass structure on a forming drum, said intermediate forming line comprising a first transfer location;

n completion locations with n≥1 for completing the intermediate portion of the carcass structure and a second transfer location in which the carcass structure is made available for subsequent assembling to the crown structure by unloading from the respective forming drum;

a handling device moveable along a first trajectory;
a first shuttle moveable between said handling device and the first transfer location and a second shuttle moveable between said handling device and the second transfer location along a second trajectory.

Preferably, at least one forming drum coming from the intermediate forming line or intended for the intermediate forming line is associated with the first shuttle.

Preferably, respectively associated with the remaining n completion locations and the second shuttle are one to n forming drums.

The present invention, in at least one of the aforementioned aspects, may also have one or more of the preferred characteristics described hereinafter.

Preferably at an operating moment at which the first transfer location is occupied by a forming drum coming from the intermediate forming line or intended for the intermediate forming line, there are n locations selected from the n completion locations and the second transfer location that are occupied by respective forming drums leaving one of the n completion locations and the second transfer location free.

This allows optimising both the flexibility and the cycle time of the plant allowing saturating the locations dedicated to the building of the carcass structure.

Preferably the transfer between the first transfer location, the n completion locations and the second transfer location is carried out by moving the forming drum along at least two trajectories intersecting at a point.

Such disposition allows optimising the movements.

Preferably the transfer between the first transfer location, the n completion locations and the second transfer location is carried out by moving a handling device along a first trajectory and at least one shuttle along a second trajectory intersecting the first trajectory.

Such disposition allows optimising the movements dedicating a specific structure to each single trajectory.

Preferably said handling device is moved along said first trajectory at least between a fixed location and said second trajectory.

The use of fixed locations connected by a moveable handling device allows optimizing the movements concentrating them on a structure predisposed to the movement along a first trajectory.

Preferably said handling device is moved along said first trajectory between two fixed locations and said second trajectory.

Preferably said handling device is moved along said first trajectory between two fixed locations, crossing said second trajectory.

Preferably said handling device is moved along said first trajectory between a fixed completion location and said second trajectory.

Maintaining the completion locations fixed avoids moving the locations dedicated to a determined processing, instead predisposing structures dedicated to the sole movement of the forming drum.

Preferably said handling device is moved along said first trajectory between at least two completion fixed locations, intersecting said second trajectory.

The crossed movement along two trajectories allows arriving to the saturation of the plant without complicating the lay-out.

Preferably at least one first shuttle adapted to carry said forming drum is moved between the first transfer location and an exchange location along said second trajectory intersecting the first trajectory.

Preferably at least one second shuttle adapted to carry said forming drum is moved between an exchange location and the second transfer location along said second trajectory intersecting the first trajectory.

The use of shuttles dedicated to the transfer of the forming drum and the identification of an exchange location allows optimizing the transfer times.

Preferably said exchange location corresponds to a location at which said forming drum is exchanged between said handling device and said first shuttle or said second shuttle.

Preferably at least in one configuration the first transfer location, the n completion locations and the second transfer location are disposed at the vertices of a polygon.

Such disposition simplifies the transfer of the forming drum.

Preferably at least one of said first trajectory and said second trajectory crosses said polygon.

This allows optimally crossing the trajectories and managing the saturation of the plant without standby locations.

Preferably said first trajectory and said second trajectory intersect each other inside said polygon or along a side thereof at an exchange location.

Preferably the first transfer location, a completion location and the second transfer location are disposed at the vertices of a triangle, said first trajectory or second trajectory being coincident with a side of said triangle.

Preferably the first transfer location, two completion locations and the second transfer location are disposed at the vertices of a quadrilateral.

Preferably the first transfer location and the second transfer location are disposed on opposite vertices of the quadrilateral.

Preferably the first trajectory and the second trajectory correspond to one diagonal of the quadrilateral respectively.

Preferably said first trajectory and/or second trajectory are rectilinear.

Preferably said first trajectory and said second trajectory are orthogonal to each other.

Preferably one completion location comprises a tyre bead-forming station.

Preferably one completion location comprises a rolling station.

Preferably said first transfer location is a location disposed along the intermediate forming line.

Such characteristic allows using the shuttle moveable along the intermediate forming line as a shuttle for moving the drum towards the completion locations.

Preferably said second transfer location is an exchange station interlocked with a station for assembling the carcass structure to the crown structure.

Such characteristic allows using the exchange shuttle with the station for assembling the carcass structure to the crown structure as the shuttle for moving the drum towards the completion locations.

Preferably at an operating moment at which the first shuttle is occupied by a forming drum coming from the intermediate forming line or intended for the intermediate forming line, n forming drums are processed between the remaining n completion locations and the second shuttle leaving one among the n completion locations and the second shuttle free.

Preferably said handling device is moved along a first trajectory and said first shuttle and second shuttle are moved along a second trajectory intersecting said first trajectory.

Preferably said handling device is moved along said first trajectory between at least one fixed completion location and said second trajectory.

Preferably said handling device is moved along said first trajectory between at least two fixed completion locations, intersecting said second trajectory.

Preferably said exchange location corresponds to a location at which said forming drum is exchanged between said handling device and first shuttle or second shuttle.

Preferably the plant comprises a forming drum coming from the intermediate forming line or intended for the intermediate forming line associated with the first shuttle and n forming drums associated with the remaining n completion locations and with the second shuttle leaving one among the n completion locations and the second shuttle free.

Preferably said second trajectory intersects the first trajectory.

Preferably the n completion locations are fixed and said handling device is moveable along said first trajectory between at least one fixed completion location and said second trajectory.

Preferably said handling device is moveable along said first trajectory between two fixed locations and said second trajectory.

Further characteristics and advantages shall be more apparent from the detailed description of a preferred and non-exclusive embodiment of a method, a process and a plant for controlling building tyres for vehicle wheels, according to the present invention.

BRIEF DESCRIPTION OF THE DRAWINGS

Such description is provided hereinafter with reference to the attached figures, also being provided purely by way of a non-limiting example, wherein:

FIGS. 2a-2j are views of a portion of the plant of FIG. 1 in different operating moments;

DETAILED DESCRIPTION OF THE INVENTION

Figure 1:
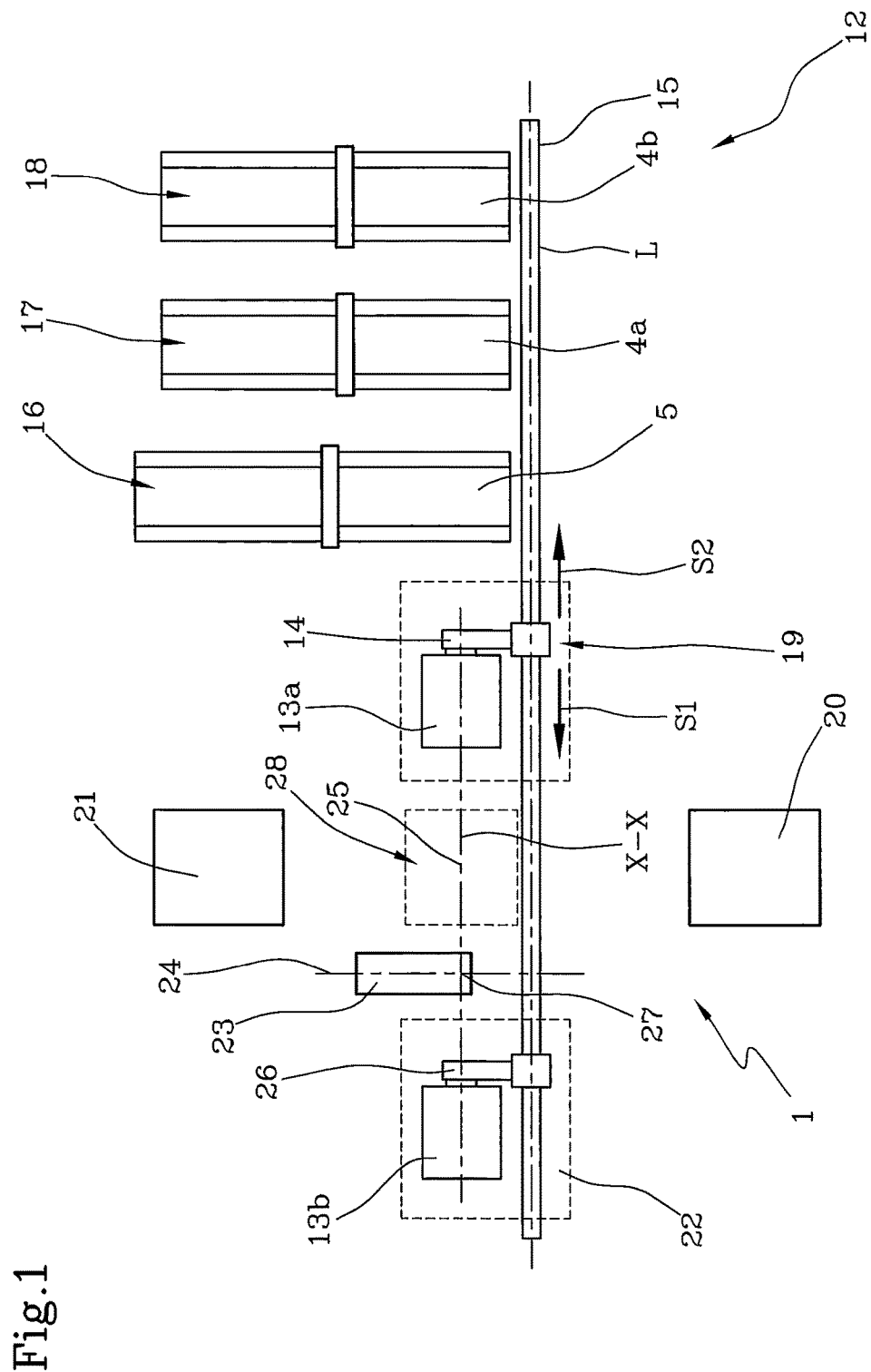
FIG. 1 schematically shows in—a plan view—a plant for building tyres for vehicle wheels according to the present invention.

With reference to FIG. 1, a plant for controlling building tyres for vehicle wheels according to the present invention was indicated with its entirety with 1.

Figure 3:
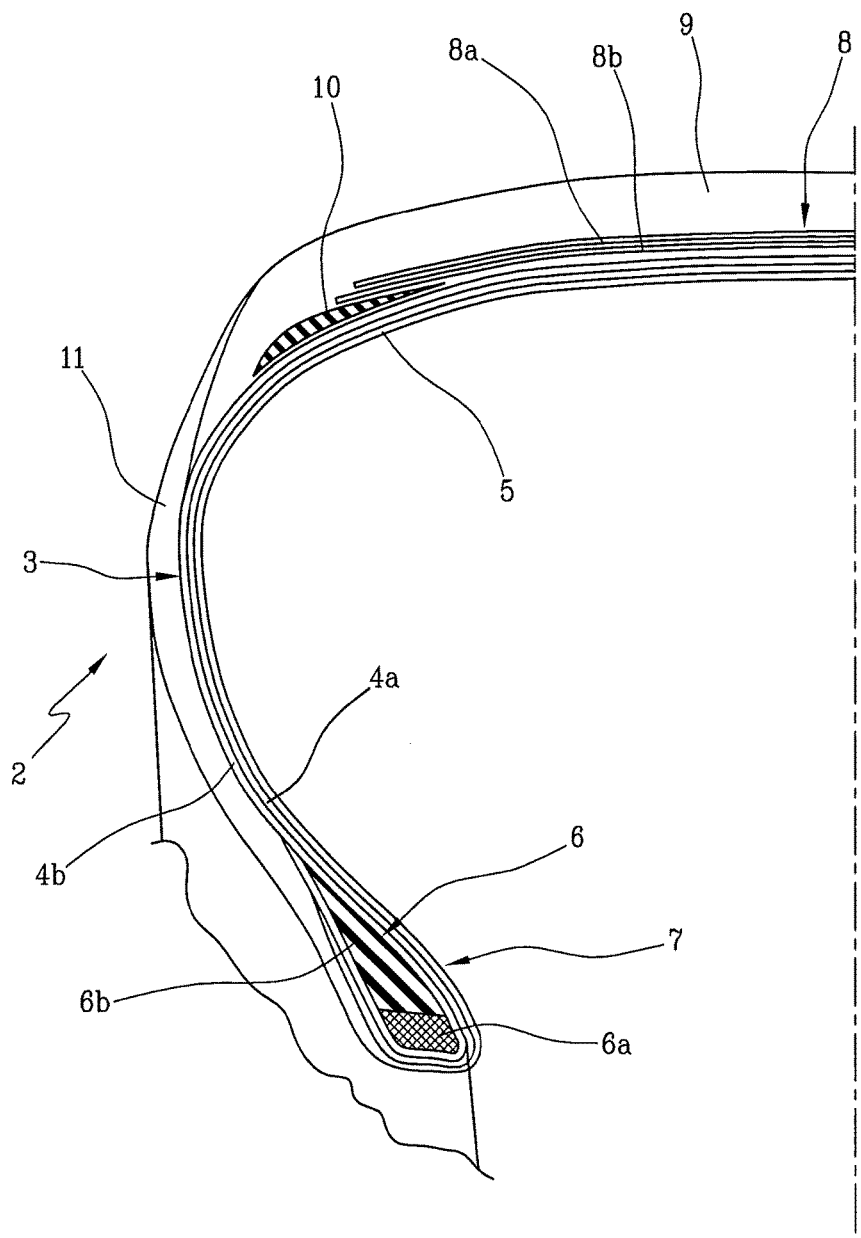
FIG. 3 shows a radial semi-section of an example of a tyre built with the plant of FIG. 1.

An example of a tyre 2, provided in said plant and according to the method and the process according to the present invention, is illustrated in FIG. 3 and essentially comprises a carcass structure 3 having at least one carcass ply (two plies in FIG. 3) 4a, 4b. A layer of impermeable elastomeric material or so-called liner 5 is applied internally to the carcass ply/plies 4a, 4b. Two annular anchoring structures 6, each comprising a so-called bead core 6a carrying an elastomeric filler 6b in a radially external position, are engaged to respective terminal zones of the carcass ply/plies 4a, 4b. The annular anchoring structures 6 are integrated in proximity of areas usually referred to by the name of "beads" 7, at which there usually occurs the engagement between the tyre 2 and a respective mounting rim. A belt structure 8 comprising at least one belt layer (two layers in FIG. 3) 8a, 8b, is circumferentially applied around the carcass ply/plies 4a, 4b, and a tread band 9 is circumferentially superimposed to the belt structure 8.

The so-called "under-belt inserts" 10 each positioned between the carcass ply/plies 4a, 4b and one of the terminal edges axially opposite to the belt structure 8 may be associated to the belt structure 8. Two sidewalls 11, each extending from the respective bead 7 to a respective lateral edge of the tread band 9, are applied in laterally opposite positions on the carcass ply/plies 4a, 4b.

According to the example illustrated in FIG. 1, the aforementioned components of the tyre 2 are made on one or more forming drums moving said forming drums between different dispensing stations of semi-finished products at each of which special devices apply the aforementioned semi-finished products on the forming drum/s.

With reference to FIG. 1 there is illustrated a building line for a carcass structure on a forming drum. In particular the building line of the carcass structure comprises an intermediate forming line 12 along which an intermediate portion of the carcass structure is built. A forming drum is moved between different dispensing stations of semi-finished products predisposed to form said intermediate portion of the carcass structure at a time. For example the intermediate portion of the carcass structure corresponds to a carcass sleeve comprising the carcass plies 4a, 4b, the liner 5, and possibly at least one part of the sidewalls 11.

FIG. 1 illustrates a forming drum 13a transported along the intermediate forming line by a first shuttle 14.

According to the illustrated example, the intermediate forming line 12 comprises a guide 15 which develops preferably rectilinear along a deposition line "L". The first shuttle 14, capable of moving, driven by a suitable motor (not illustrated), along the guide 15 and in both directions of movement "S1", "S2" is mounted on the guide 15. The first shuttle 14 is capable of supporting a forming drum at a time and rotating it around a rotation axis "X-X" coincident with the longitudinal symmetry axis of the drum itself and with the rotation axis of the tyre 2 being formed. In the illustrated embodiment, the drum is carried cantilevered by the first shuttle 14, which comprises a gripping element capable of withholding or releasing a terminal end of a central shaft of the forming drum.

Beside the guide 15 and preferably, according to what is illustrated, on only one side of the same, stations for dispensing a semi-finished product are present. According to what is illustrated in the attached FIG. 1, a station 16 for dispensing a liner 5, a station 17 for dispensing the first carcass ply 4a, a station 18 for dispensing the second carcass ply 4b are provided by way of example. The plant illustrated in FIG. 1 is thus predisposed for building the tyre 2 illustrated in FIG. 3.

The first shuttle 14 further comprises movement devices, not illustrated, adapted to vertically move the gripping element and the drum constrained thereto in two directions along a direction orthogonal to a longitudinal development of the guide 15. Such movement is aimed at providing carcass structures of different diameters.

A first transfer location 19 may be defined at one of the terminal ends of the guide 15. In particular the intermediate forming line comprises the first transfer location 19.

The first shuttle 14 is moveable at least up to the first transfer location 19 for making available the forming drum with the intermediate portion of the carcass structure for the subsequent processing operations.

In addition, there are provided n completion locations with n≥1 for completing the intermediate portion of the carcass structure. In the example illustrated in the attached figures there are provided two completion locations for example is respectively comprising a tyre bead-forming station 20 and a rolling station 21.

Furthermore, the plant comprises a second transfer location 22 in which the carcass structure is made available for the subsequent assembling with the crown structure by unloading from the respective forming drum and subsequent transfer to a building drum (not illustrated). Preferably said crown structure comprises at least one belt strip and a tread band.

A moveable handling device along a first trajectory 24 is indicated with 23. Besides the movements related to the deposition of the carcass structure, the first shuttle 14 is moveable, in particular between the handling device and the first transfer location 19, following a second trajectory 25.

The plant 1 also comprises a second shuttle 26.

Besides the movements related to the moving away of the carcass structure, the second shuttle 26 is moveable in particular between the handling device 23 and the second transfer location 22 preferably along the second trajectory 25.

Preferably the first trajectory 24 and/or the second trajectory 25 are rectilinear. In particular the first trajectory 24 and the second trajectory 25 are orthogonal to each other as illustrated in the attached figures.

Possibly the second trajectory 25 may be provided by a broken line with a vertex at the handling device.

According to an alternative embodiment (not illustrated), the trajectories could be disposed on incident planes.

With the example illustrated in FIGS. 2a-2j, forming drums used in the building line of the carcass structure in a given operating moment, in conditions of saturation of the plant 1 were indicated with 13a-13c.

Figure 2A:
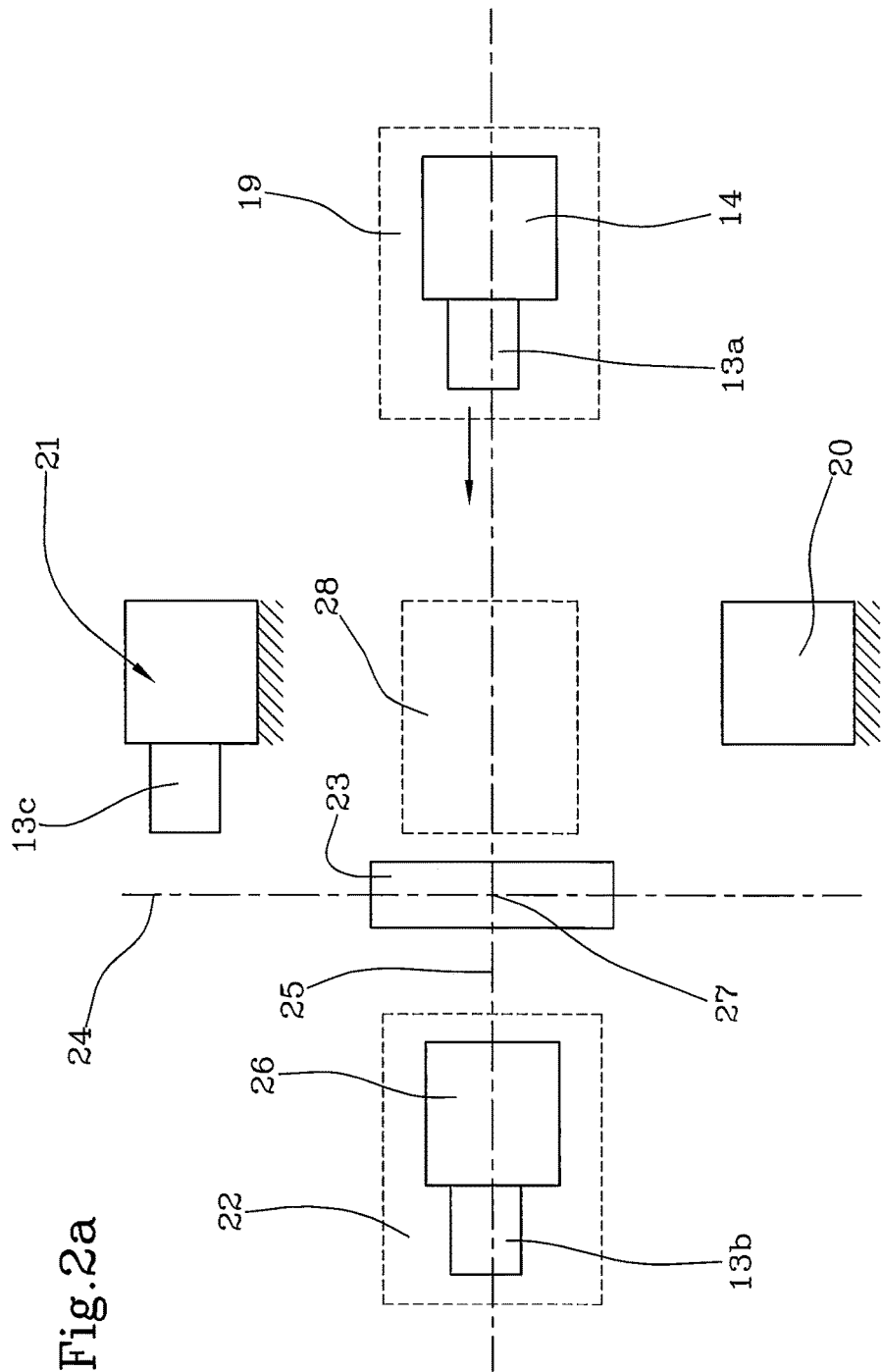

With reference to the operating moment represented in FIG. 2a, a forming drum 13a coming from the intermediate forming line 12 is associated with the first shuttle 14. In the same operating moment n forming drums are respectively associated with the remaining n completion locations and with the second shuttle 26 leaving one among the n completion locations and the second shuttle 26 free. In particular in FIG. 2a a forming drum 13b is associated to the second shuttle 26 and a forming drum 13c is associated to the rolling station 21 while the tyre bead-forming station 20 is free.

Generally, in the operating moment in which a forming drum 13a coming from the intermediate forming line 12 or intended for the intermediate forming line 12 is associated with the first shuttle 14, one to n forming drums are respectively associated with the remaining n completion locations and the second shuttle.

It should be observed that the plant 1 may also be operative with only one forming drum for example in the industrialization activities, for example when building small batches of tyres to be controlled step by step.

In the example of the illustrated figures there are n=2 completion stations 20, 21, and n+1=3 forming drums 13a-13c.

For example as illustrated in the attached figures, the second trajectory 25 intersects the first trajectory 24 at a point 27. An exchange location 28 can be observed at or in proximity of such point.

According to the embodiment illustrated in the figures, the n completion locations (tyre bead-forming station 20 and rolling station 21) are fixed. The handling device 23 is moveable along the first trajectory 24 between at least one fixed completion location, preferably two fixed completion locations, and the second trajectory 25 as illustrated hereinafter with reference to the operation of the plant 1.

Generally, at least in one configuration the first transfer location, the n completion locations and the second transfer location are disposed at the vertices of a polygon. In particular, with reference to the attached figures, the first transfer location 19, two completion locations 20, 21 and the second transfer location 22 are disposed at the vertices of a quadrilateral. Preferably the first transfer location 19 and the second transfer location 22 are disposed on opposite vertices of the quadrilateral.

Preferably at least one among the first trajectory 24 and the second trajectory 25 crosses the polygon, in particular the quadrilateral. As illustrated in the figures, the first trajectory 24 and the second trajectory 25 intersect each other inside the polygon or along a side thereof at the exchange location.

With reference to the quadrilateral disposition example illustrated in the figures, the first trajectory 24 and the second trajectory 25 respectively correspond to one diagonal of the quadrilateral.

According to a possible embodiment, not illustrated, the first transfer location, a completion location and the second transfer location are disposed at the vertices of a triangle. In this case, the first or second trajectory may coincide with a side of the triangle.

The aforementioned disposition may for example be provided in the case where the tyre bead-forming station 20 and the rolling station 21 are embedded in a single location.

In use, according to the method and the process according to the invention, according to the manufacturing instructions of the tyre to be built, the dispensing stations are installed in the intermediate forming line 12.

The intermediate forming line 12 operates on a forming drum at a time on which the dispensing stations deposit the respective semi-finished products in a predefined sequence.

In particular, the forming of the components of an intermediate portion of a carcass structure of a tyre on the respective forming drum, is carried out by making available a forming drum 13a on the first shuttle 14 moveable along the intermediate forming line 12, moving the first shuttle 14 on the intermediate forming line to bring to at least some of a plurality of dispensing stations. A component of the intermediate portion of the carcass structure is formed at each of such dispensing stations.

The first shuttle 14 comprising the forming drum 13a provided with the intermediate portion of the carcass structure, thus reaches the first transfer location 19.

The intermediate portion of the carcass structure transferring the respective forming drum 13a between the first transfer location 19, the n completion locations, and the second transfer location 22 up to making available the completed carcass structure for the subsequent assembling with the crown structure by transferring the carcass structure itself to a conformation drum (not illustrated) is completed afterwards. In particular the forming drum 13a is transferred from the first shuttle 14 to the handling device 23 moveable between the n completion locations bringing the first shuttle 14 at the exchange location 28. Thus, the handling device transfers the forming drum 13a between the n completion locations for completing the carcass structure. The forming drum provided with the completed carcass structure is transferred from the handling device 23 to the second shuttle 26 brought in the exchange position 28. Thus, the second shuttle 26 is brought in the second transfer location 22 wherein the carcass structure is made available for the subsequent assembling with the crown structure.

Lastly, the forming drum 13a clear of the carcass structure is transferred from the second transfer location 22 to the first transfer location 19 for building a subsequent intermediate portion of the carcass structure. In particular the forming drum clear of the carcass structure is transferred from the second shuttle 26 to the first shuttle 14, preferably by means of the handling device 23.

With reference to FIGS. 2a-2j, there is explained the use of the plant described above in conditions of saturation which, considering two completion stations, is reached using three forming drums 13a-13c.

For the sake of description simplicity, there shall be considered the condition in which the first shuttle 14 is associated to a forming drum 13a carrying an intermediate portion of the carcass structure disposed along the intermediate forming line 12. In particular the forming drum 13a carrying the intermediate portion of the carcass structure associated with the first shuttle 14, is made available at the first transfer location 19 after the first shuttle 14 was moved along the guide 15 at the dispensing stations adapted to obtain the intermediate portion of the carcass structure of the tyre being processed.

In order to complete an intermediate portion of the carcass structure, the respective forming drum is transferred between the first transfer location 19, n completion locations with n≥1, and the second transfer location 22 in which the completed carcass structure is made available for the subsequent assembling with the crown structure by unloading from the respective forming drum.

Lastly, the forming drum clear of the carcass structure is transferred from the second transfer location 22 to the first transfer location 19 for building a subsequent intermediate portion of the carcass structure of another tyre.

In FIG. 2a the forming drum 13a carrying the intermediate portion of the carcass structure disposed along the intermediate forming line 12 is available at the first transfer location 19. Furthermore, the plant provides for further drums, in particular a drum 13b associated to the second shuttle 26 at the second transfer location 22 and a drum 13c associated to one of the completion locations for example to the rolling station 21.

In order to transfer the forming drum 13a to the tyre bead-forming station 20, the first shuttle is moved along the second trajectory 25 up to the exchange location 28 with the handling device 23.

At the exchange location 28 the forming drum 13a is transferred from the first shuttle 14 to the handling device (FIG. 2b), Following such transfer the handling device 23 is moved along the first trajectory 24 from the exchange location 28 to the free completion location (the bead-forming station 20 in this case). Once the handling device 23 leaves the exchange location 28, the second shuttle 26 provided with the forming drum 13b clear of the carcass structure is moved from the second transfer location 22 to the exchange location 28.

The handling device 23 reaches the tyre bead-forming station 20 (FIG. 2c) in which the forming drum 13a may be transferred from the handling device 23 to the tyre bead-forming station. The handling device 23 is thus moved to return to the exchange location 28, in which the second shuttle 26 is positioned.

The handling device 23 reaches the exchange location 28. The forming drum 13b clear of the carcass structure is transferred from the second shuttle 26 to the handling device 23 (FIG. 2d). Thus, the handling device 23 with the forming drum 13b is moved away from the exchange location 28.

The second shuttle 26 moves away from the exchange location 28 (in particular returning to the second transfer location 22—FIG. 2e). The handling device 23 with the forming drum 13b is moved towards the exchange location 28 (FIG. 2f). The first shuttle 14 is moved towards the exchange location 28.

The handling device 23 and the first shuttle 14 reach the exchange location 28 in which the forming drum 13b is transferred from the handling device 23 to the first shuttle 14 (FIG. 2f). The first shuttle 14 with the empty forming drum 13b is moved towards the first exchange location 19, the handling device 23 is moved towards the rolling station 21 and the second shuttle 26 is moved towards the exchange location 28 (FIG. 2g).

The first shuttle 14 proceeds along the intermediate forming line for the deposition of an intermediate portion of the carcass on the forming drum 13b (step not illustrated).

The handling device 23 reaches the rolling station 21 in which the forming drum 13c is transferred from the rolling station 21 to the handling device 23 (FIG. 2g). The second shuttle 26 reaches the exchange location 28. The handling device 23 is moved towards the exchange location 28.

Figure 2H:
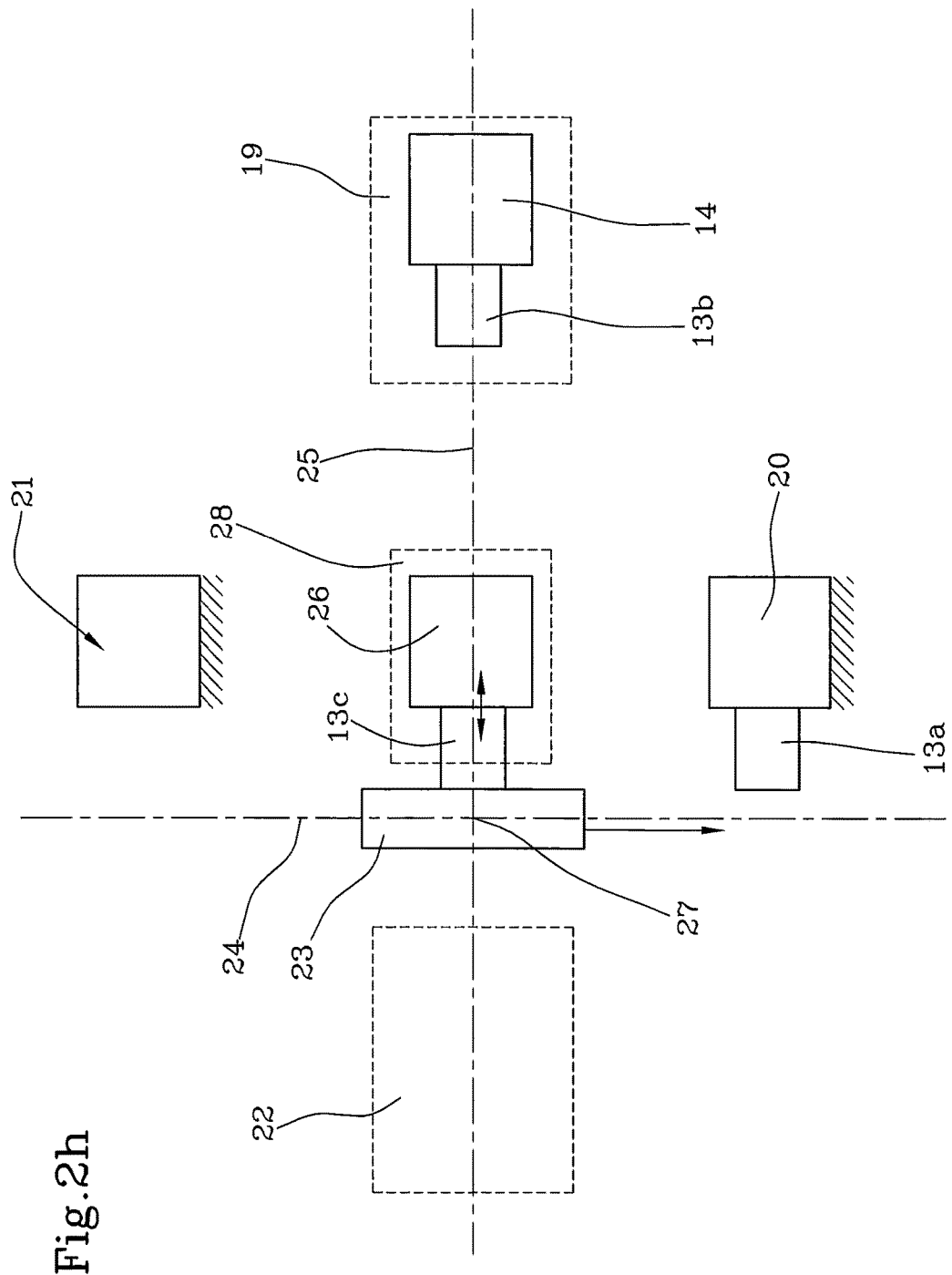

The handling device 23 reaches the exchange location 28 in which it transfers the forming drum 13c to the second shuttle 26 (FIG. 2h). The handling device 23 is moved from the exchange location 28 to the tyre bead-forming station 20.

Figure 2I:
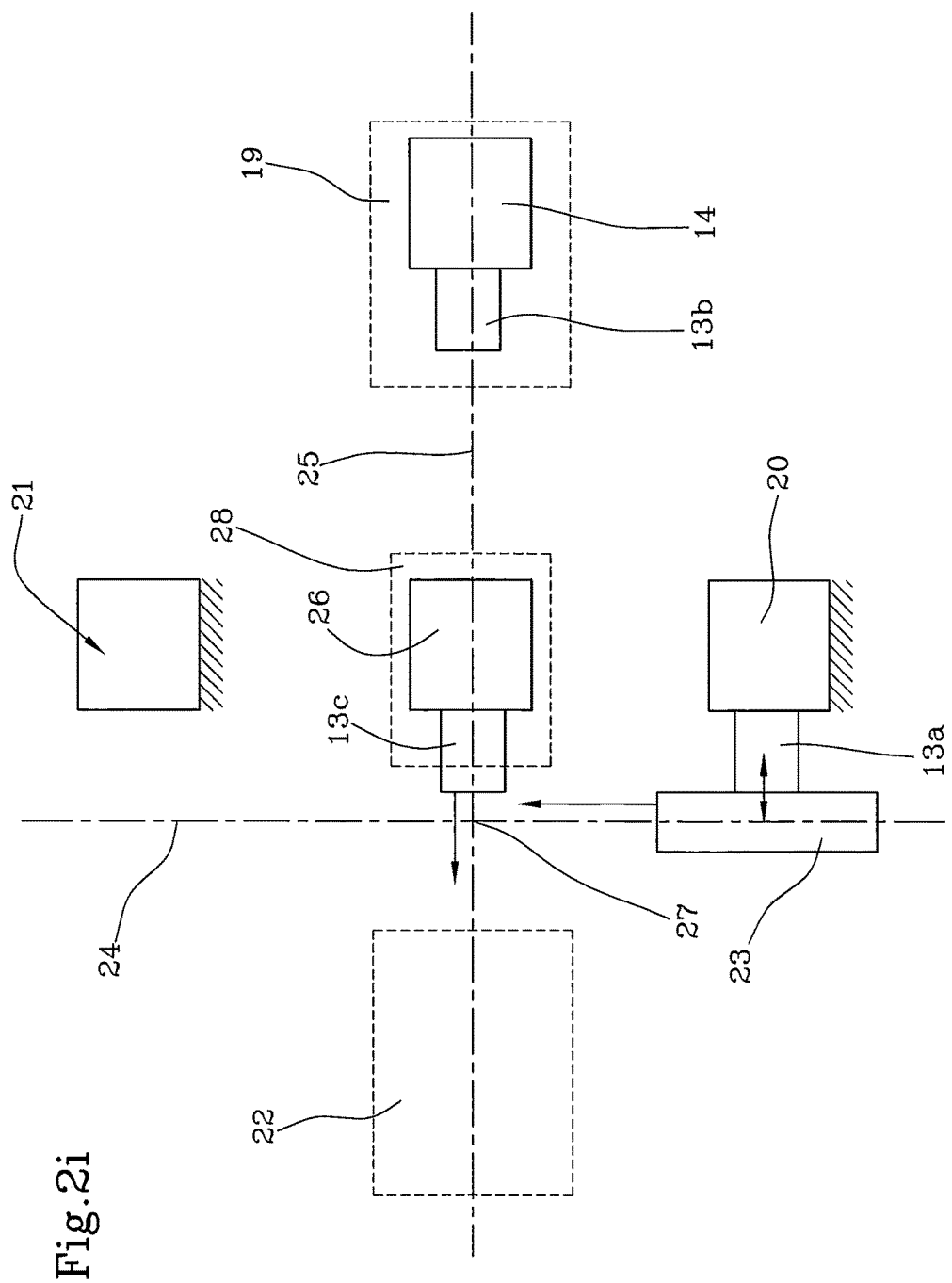

The handling device 23 reaches the tyre bead-forming station 20 in which the forming drum 13a is transferred to the handling device 23 (FIG. 2i). The second shuttle 26 with the forming drum 13c is moved towards the second transfer location 22. The handling device 23 with the forming drum 13a is moved towards the rolling station 21.

Figure 2J:
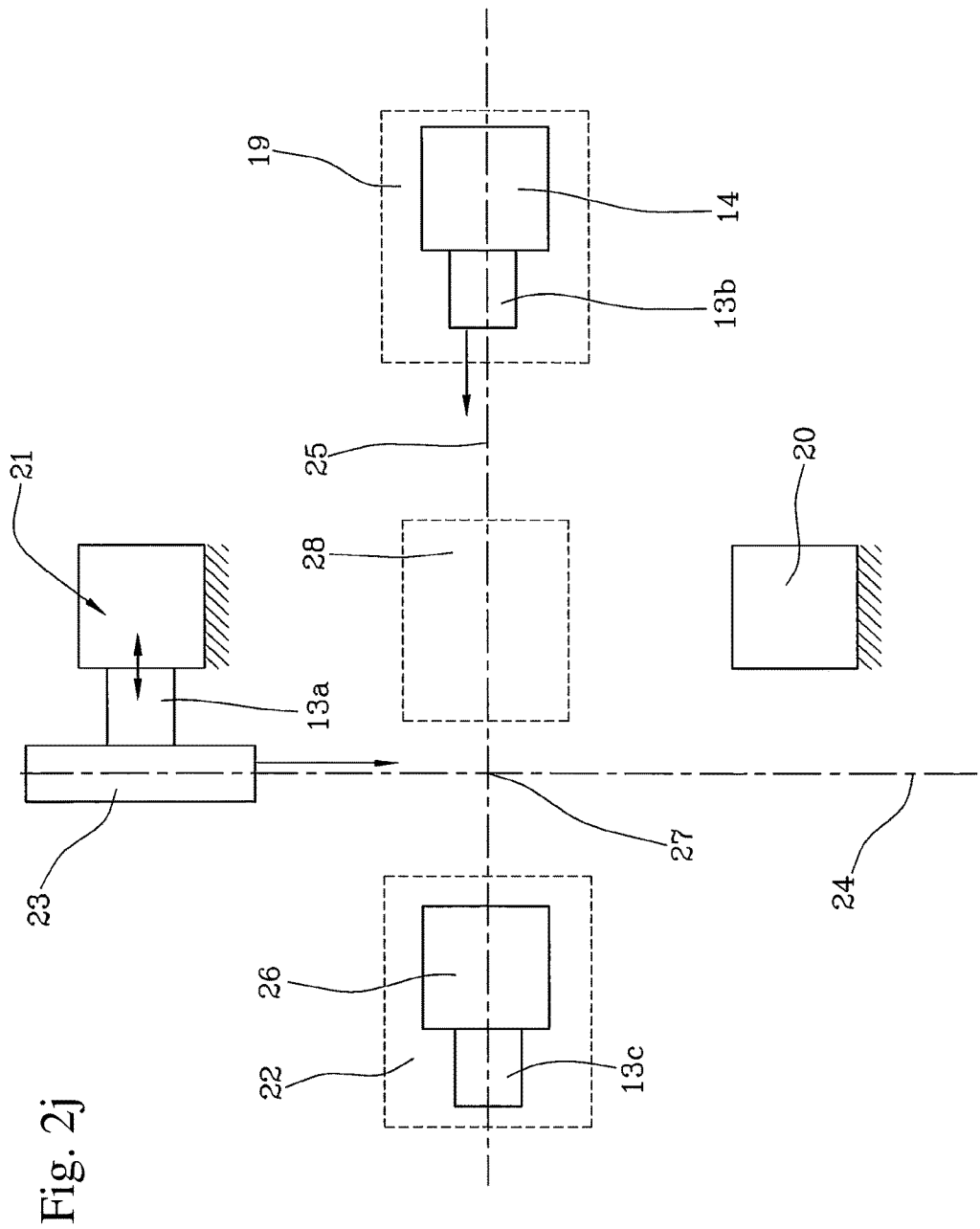

The second shuttle 26 with the forming drum 13c reaches the second transfer location 22. The handling device 23 with the forming drum 13a reaches the rolling station 21 (FIG. 2j). The forming drum 13a is transferred from the handling device to the rolling station 21. The handling device 23 and the first shuttle 14 with the forming drum 13b—on which the intermediate portion of the carcass structure is disposed—are moved towards the exchange location 28.

The condition of FIG. 2j is analogous to that of FIG. 2a. The two conditions differ in that the forming drums have been subjected to a series of transfers. The exact configuration of FIG. 2a occurs after other two cycles analogous to those described previously.

According to what has been described above, at least in the condition of FIGS. 2a and 2j, corresponding to an operating moment in which the first transfer location is occupied by a forming drum coming from the intermediate forming line (forming drum 13a, 13b) or intended for the intermediate forming line (forming drum 13b, 13c), from one to n locations selected from the n completion locations and the second transfer location are occupied by respective forming drums. In particular n (n=2 in the illustrated example) locations selected from the n completion locations and the second transfer location are occupied by respective forming drums leaving one location (tyre bead-forming station 20), among the n completion locations and the second transfer location, free.

In other words at least in the condition of FIGS. 2a and 2j, corresponding to an operating moment in which the first shuttle 14 is occupied by a forming drum coming from the intermediate forming line (forming drum 13a, 13b) or intended for the intermediate forming line (forming drum 13b, 13c), one to n forming drums are processed between the remaining n completion locations and the second shuttle 26. Preferably there are processed n (n=2 in the illustrated example) forming drums between the remaining n completion locations and the second shuttle leaving one (tyre bead-forming station) from among the n completion locations and the second shuttle 26 free.

With reference to the figures described above, it may be observed that the transfer of a forming drum between the first transfer location 19, the n completion locations and the second transfer location 22 is carried out by moving the forming drum along at least two trajectories 24, 25 intersecting at a point 27.

In particular the transfer between the first transfer location 19, the n completion locations and the second transfer location 22 is carried out by moving the handling device 23 along the first trajectory 24 and at least one shuttle between at least one first and second shuttle along the second trajectory 25 intersecting the first trajectory 24.

The handling device 23 is moved along the first trajectory 24 between the two fixed completion locations, crossing the second trajectory 25.

In particular at least one first shuttle 14 adapted to carry a forming drum is moved between the first transfer location 19 and the exchange location 28 along the second trajectory 25 intersecting the first trajectory 24.

Furthermore at least one second shuttle 26 adapted to carry a forming drum is moved between the exchange location 28 and the second transfer location 22 along the second trajectory 25 intersecting the first trajectory 24.

As illustrated in the figures, the exchange location 28 corresponds to a location at which the forming drum is exchanged between the handling device 23, and the first shuttle 14 or the second shuttle 26.

According to what has been illustrated, the first transfer location 19 is a location disposed along the intermediate forming line 12. Furthermore, the second transfer location 22 is an exchange station interlocked with a station (not illustrated) for assembling the carcass structure with the crown structure.

According to what has been described above, a wide flexibility with low cycle times (about 1 minute) saturating the line and avoiding stand-by or parking stations may be obtained.

Though multi-axis robots may be used, the plant described above may be simple, reliable and rigid using moveable handling device/shuttle (besides the movements required for the processing) along a preferably rectilinear and preferably horizontal trajectory.

The invention claimed is:

1. A method for controlling building of a tyre for vehicle wheels, comprising:
   building a carcass structure on a forming drum; and
   assembling the carcass structure to a crown structure, wherein building of the carcass structure comprises:
   building one intermediate portion of the carcass structure at a time on a respective forming drum by moving the forming drum in opposite rectilinear directions of movement along a shuttle guide within an intermediate forming line;
   making available the forming drum with the intermediate portion of the carcass structure at a first transfer location;
   completing the intermediate portion of the carcass structure by moving the respective forming drum between the first transfer location, n completion locations with n≥1, and a second transfer location in which the carcass structure is made available for subsequent assembling with the crown structure by unloading from the respective forming drum and by transferring the forming drum to each completion location and the second transfer location, wherein a first shuttle and a second shuttle carry the forming drum to the first transfer location and second transfer location, respectively, in cantilevered fashion by holding a terminal end of a central shaft of the forming drum;
   transferring the forming drum clear of any carcass structure from the second transfer location to the first transfer location, and
   building a subsequent intermediate portion of a subsequent carcass structure of a different tyre on the forming drum having been transferred from the second transfer location to the first transfer location,
   wherein at an operating moment at which the first transfer location is occupied by a forming drum coming from the intermediate forming line or intended for the intermediate forming line, there are one to n locations selected from the n completion locations and the second transfer location that are occupied by respective forming drums.

2. The method for controlling building of a tyre for vehicle wheels as claimed in claim 1, wherein, at an operating moment at which the first transfer location is occupied by a forming drum coming from the intermediate forming line or intended for the intermediate forming line, there are n locations selected from the n completion locations and the second transfer location that are occupied by respective forming drums leaving one of the n completion locations and the second transfer location free.

3. The method for controlling building of a tyre for vehicle wheels as claimed in claim 1, wherein transfer between the first transfer location, the n completion locations and the second transfer location is carried out by moving the forming drum along at least two trajectories intersecting at a point.

4. The method for controlling building of a tyre for vehicle wheels as claimed in claim 1, wherein transfer between the first transfer location, n completion locations and the second transfer location is carried out by moving a handling device along a first trajectory and the first shuttle and second shuttle along a second trajectory intersecting the first trajectory.

5. The method for controlling building of a tyre for vehicle wheels as claimed in claim 4, wherein said handling device is moved along said first trajectory at least between a fixed location and said second trajectory.

6. The method for controlling building of a tyre for vehicle wheels as claimed in claim 4, wherein said handling device is moved along said first trajectory between two fixed locations and said second trajectory.

7. The method for controlling building of a tyre for vehicle wheels as claimed in claim 6, wherein said handling device is moved along said first trajectory between two fixed locations, crossing said second trajectory.

8. The method for controlling building of a tyre for vehicle wheels as claimed in claim 4, wherein said handling device is moved along said first trajectory between a fixed completion location and said second trajectory.

9. The method for controlling building of a tyre for vehicle wheels as claimed in claim 4, wherein said handling device is moved along said first trajectory between at least two fixed completion locations intersecting said second trajectory.

10. The method for controlling building of a tyre for vehicle wheels as claimed in claim 4, wherein the first shuttle is moved between the first transfer location and an exchange location along said second trajectory intersecting the first trajectory.

11. The method for controlling building of a tyre for vehicle wheels as claimed in claim 10, wherein the second shuttle is moved between said exchange location and the second transfer location by crossing over and moving past an intersection of said first trajectory and said second trajectory.

12. The method for controlling building of a tyre for vehicle wheels as claimed in claim 11, wherein said exchange location corresponds to a location at which said forming drum is exchanged between said handling device and said first shuttle or second shuttle,
   wherein said forming drum is exchanged between said second shuttle and said handling device by moving said second shuttle from the second transfer location to the exchange location by crossing the intersection of said first trajectory and said second trajectory.

13. The method for controlling building of a tyre for vehicle wheels as claimed in claim 4, wherein at least in one configuration the first transfer location, n completion locations and second transfer location are disposed at vertices of a polygon.

14. The method for controlling building of a tyre for vehicle wheels as claimed in claim 13, wherein at least one of said first trajectory and second trajectory crosses said polygon.

15. The method for controlling building of a tyre for vehicle wheels as claimed in claim 13, wherein said first trajectory and second trajectory intersect inside said polygon or along a side thereof at an exchange location.

16. The method for controlling building of a tyre for vehicle wheels as claimed in claim 4, wherein the first transfer location, one completion location and the second transfer location are disposed at vertices of a triangle, said first trajectory or second trajectory being coincident with a side of said triangle.

17. The method for controlling building of a tyre for vehicle wheels as claimed in claim 4, wherein the first transfer location, two completion locations and the second transfer location are disposed at vertices of a quadrilateral.

18. The method for controlling building of a tyre for vehicle wheels as claimed in claim 17, wherein the first transfer location and second transfer location are disposed on opposite vertices of the quadrilateral.

19. The method for controlling building of a tyre for vehicle wheels as claimed in claim 18, wherein each of the first trajectory and second trajectory correspond to one diagonal of the quadrilateral, respectively.

20. The method for controlling building of a tyre for vehicle wheels as claimed in claim 4, wherein said first trajectory and/or second trajectory are rectilinear.

21. The method for controlling building of a tyre for vehicle wheels as claimed in claim 20, wherein said first trajectory and second trajectory are orthogonal to each other.

22. The method for controlling building of a tyre for vehicle wheels as claimed in claim 1, wherein one completion location comprises a tyre bead-forming station.

23. The method for controlling building of a tyre for vehicle wheels as claimed in claim 1, wherein one completion location comprises a rolling station.

24. The method for controlling building of a tyre for vehicle wheels as claimed in claim 1, wherein said first transfer location is a location disposed along the intermediate forming line.

25. The method for controlling building of a tyre for vehicle wheels as claimed in claim 1, wherein said second transfer location is an exchange station interlocked with a station for assembling the carcass structure to the crown structure.

26. A process for controlling building of a tyre for vehicle wheels, comprising:
    forming a carcass structure of a tyre on a forming drum by:
    making the forming drum available on a first shuttle movable along a shuttle guide within an intermediate forming line;
    building one intermediate portion of the carcass structure at a time on a respective forming drum by moving the first shuttle carrying the forming drum in opposite rectilinear directions of movement on the intermediate forming line to bring the first shuttle to two or more of a plurality of dispensing stations in which, at each of said two or more dispensing stations, a component of the intermediate portion of the carcass structure is formed;
    bringing the first shuttle carrying the forming drum provided with the intermediate portion of the carcass structure to a first transfer location, wherein the first shuttle carries the forming drum in cantilevered fashion by holding a terminal end of a central shaft of the forming drum;
    transferring the forming drum from the first shuttle to a handling device at an exchange location with said handling device;
    completing the carcass structure by transferring the forming drum between n completion locations with n>1 by said handling device;
    transferring the forming drum provided with the completed carcass structure to a second shuttle brought to an exchange position with said handling device;
    bringing the second shuttle carrying the forming drum with the completed carcass structure to a second transfer location in which the completed carcass structure is made available for assembling the carcass structure to a crown structure by unloading from the forming drum, wherein the second shuttle carries the forming drum in cantilevered fashion by holding the terminal end of the central shaft of the forming drum; and
    transferring the forming drum, which is clear of any carcass structure, from the second shuttle at the second transfer location to the first shuttle at the first transfer location, and
    building a subsequent intermediate portion of a subsequent carcass structure of a different tyre on the forming drum having been transferred from the second transfer location to the first transfer location,
    wherein at an operating moment at which the first shuttle at the first transfer location is occupied by a forming drum coming from the intermediate forming line or intended for the intermediate forming line, one to n locations selected from the n completion locations and the second shuttle at the second transfer location are occupied by respective forming drums.

27. The process for controlling building of a tyre for vehicle wheels as claimed in claim 26, wherein at an operating moment at which the first shuttle is occupied by a forming drum coming from the intermediate forming line or going to the intermediate forming line, n forming drums are processed between the remaining n completion locations and the second shuttle leaving one location, among the n completion locations and the second shuttle free.

28. The process for controlling building of a tyre for vehicle wheels as claimed in claim 27, wherein said handling device is moved along a first trajectory, and wherein said first shuttle and second shuttle are moved along a second trajectory intersecting said first trajectory.

29. The process for controlling building of a tyre for vehicle wheels as claimed in claim 28, wherein said handling device is moved along said first trajectory between two or more fixed completion locations intersecting said second trajectory.

30. The process for controlling building of a tyre for vehicle wheels as claimed in claim 26, wherein said exchange location corresponds to a location at which said forming drum is exchanged between said handling device and the first shuttle or the second shuttle.

* * * * *